May 21, 1929.
A. H. SKAER
DRILL STEEL RETAINER
Re. 17,300
Original Filed May 16, 1925
2 Sheets-Sheet 1
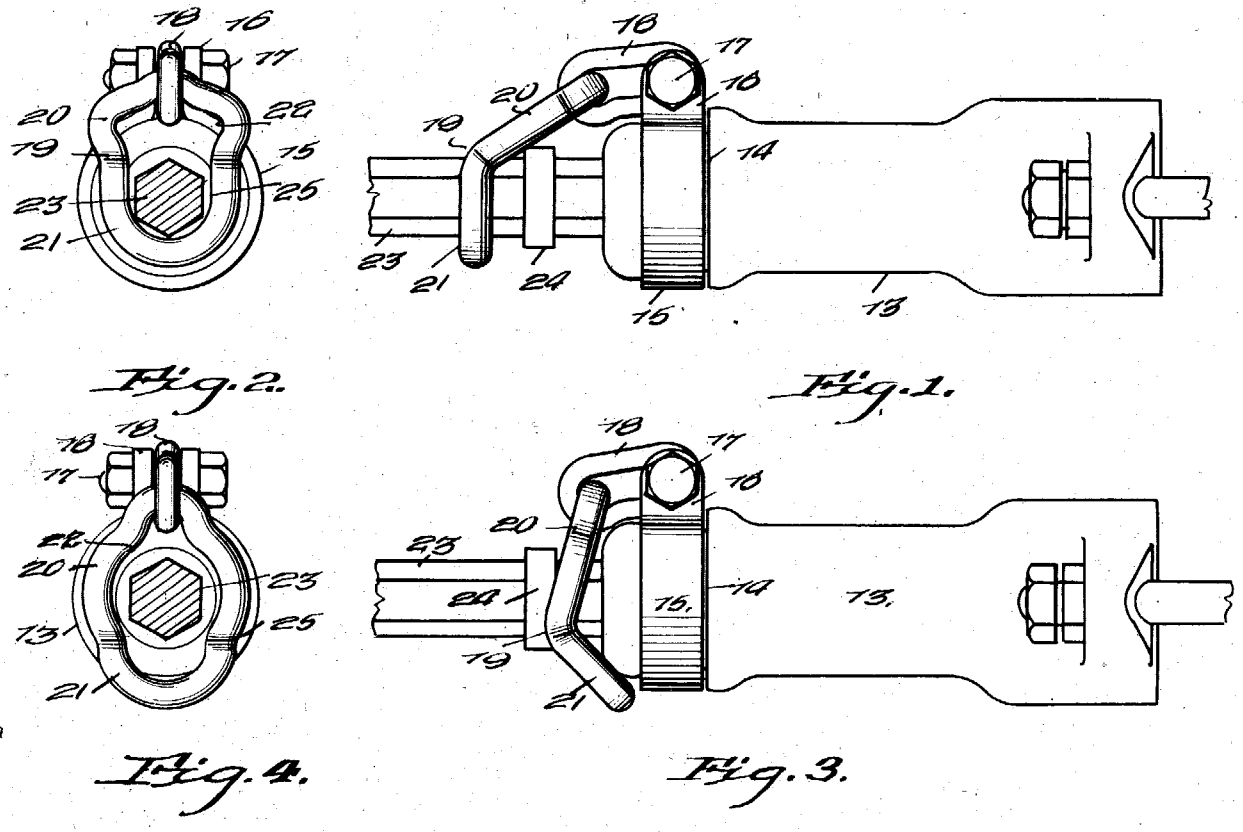
Inventor
A. H. Skaer
By
Attorney May 21, 1929.

A. H. SKAER

DRILL STEEL RETAINER

Re. 17,300

Original Filed May 16, 1925

2 Sheets-Sheet 2

Inventor

A. H. Skaer

By

Attorney

Reissued May 21, 1929. Re. 17,300

UNITED STATES PATENT OFFICE.

ARTHUR H. SKAER, OF DENVER, COLORADO, ASSIGNOR TO THE DENVER ROCK DRILL MFG. CO., OF DENVER, COLORADO, A CORPORATION OF DELAWARE.

DRILL-STEEL RETAINER.

Original No. 1,613,139, dated January 4, 1927, Serial No. 30,731, filed May 16, 1925. Application for reissue filed June 22, 1928. Serial No. 287,517.

The present invention has for its object to provide a simple but very effective means for retaining a drill steel in its chuck, this means constituting a coupling between the steel and the drilling mechanism, so that the latter may be employed for pulling the former from a drilled hole, and will permit the necessary movement of the drill steel with respect to the drilling mechanism under ordinary conditions.

In the accompanying drawings:

Figure 1 is a side elevation of one embodiment of the invention.

Figure 2 is an end elevation of the same,

Figure 3 is a view showing the retainer in its inoperative position.

Figure 4 is an end view of the structure as shown in Figure 3.

Figure 5:
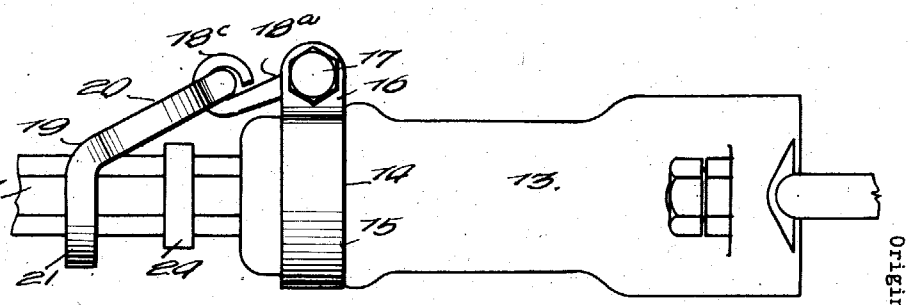
Figure 5 is a side elevation of a slightly different form of construction showing the retainer in its active position.

In the embodiment shown in Figures 1–4 inclusive, the drilling motor is designated 13, and may be of any desired construction. The front end of the barrel is provided with an annular groove 14, in which is rotatably engaged a collar 15, the terminals of which are outset to form ears 16 joined by a tie bolt 17. On this tie bolt 17 and between the ears 16 is a swinging link 18, and loosely engaged in said link is a steel retaining link or loop 19.

This link or loop 19 consists of angularly disposed portions 20 and 21. The portion 20 has its internal space 22 sufficiently large to permit the passage therethrough, not only of a drill steel, as 23, but also of the usual collar 24 of said drill steel. The portion 21 of the retaining link 19 has the space 25 therein of sufficient area to permit the passage of the steel 23, but too small to permit the passage of the collar 24 which will thus abut against said portion 21.

With this arrangement, it will be evident that the retaining link can be swung down, as indicated in Figures 3 and 4, so that the inner end of a drill steel and the collar thereof may be passed through the larger space 22 and the steel inserted in the chuck of the drilling motor. When the retaining link is swung outwardly, as illustrated in Figures 1 and 2, then the steel will be engaged in the smaller portion 25 of the retaining link and the collar will be behind said portion, so that the drill steel cannot become completely disengaged from the drilling motor.

Figure 7:
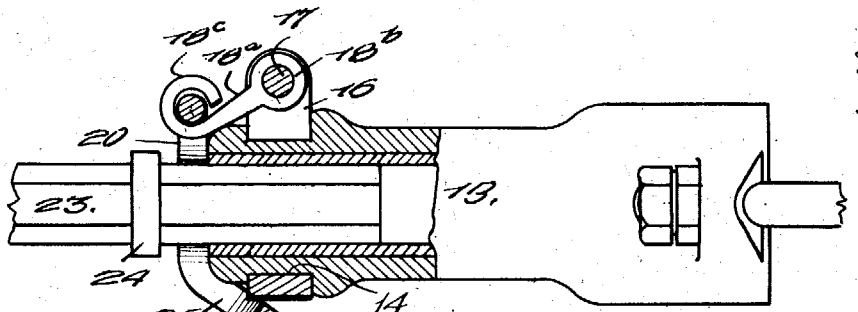
Figure 7 is a sectional view of the structure shown in Figures 5 and 6, but with the retainer in an inactive position.
Figure 6:
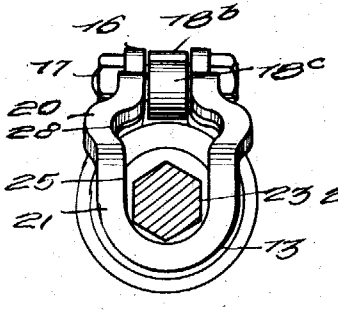
Figure 6 is an end view thereof.
Figure 8:
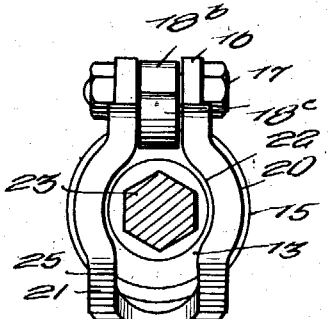
Figure 8 is an end view of the retainer when in the position shown in Figure 7.

In the structure shown in Figures 6–8 inclusive, the parts are substantially the same in function and operation, except that the link 18 of Figures 1–4 inclusive, is substituted by a link $18^a$ having a terminal eye $18^b$ that surrounds the bolt 17, and the other end of the link is formed into a loop $18^c$ that surrounds the end portion of the loop having the larger space.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim is:

1. The combination with means for holding a collared drill steel, of a retainer for the steel having a portion that will permit the passage of the collar of the drill steel therethrough, and a portion communicating with the first portion and that will prohibit the passage of the collar, and a flexible connection between the retainer and the steel holding means located at one side of the holder and steel for movably mounting the retainer on the drill holding means wholly in advance thereof.

2. The combination with means for holding a collared drill steel, of a retainer for the steel comprising a link that surrounds the steel and has an orifice through which the steel passes, a part of this orifice being sufficiently small to prevent the passage of the collar and a portion sufficiently large to permit the passage of said collar, and a link pivotally connected to the retaining link and pivotally mounted on the steel holding means to permit the retaining link to be positioned so that the steel will pass through either of said portions of the orifice.

3. The combination with means for holding a collared drill steel, of a retainer for the steel comprising a link that surrounds the steel and has an orifice through which the steel passes, a part of this orifice being sufficiently small to prevent the passage of the collar and a portion sufficiently large to permit the passage of said collar, and a link pivotally connected to the retaining link at the broader side of the orifice, said link being pivotally mounted on the steel holding means to permit the retaining link to be positioned so that the steel will pass through either of said portions of the orifice.

4. The combination with means for holding a collared steel and having a socket for receiving such steel, of a retaining link comprising angularly disposed portions, one portion having its interior space of less width than the collar of the steel, the other portion having its interior space greater than the width of said collar, and a pivotal mounting for the retaining link engaged with the outer free end of one of said angular portions, said mounting being of a length to permit either portion to swing to a position across the drill steel in advance of the holding means.

5. The combination with means for holding a collared steel and having a socket for receiving such steel, of a retaining link comprising angularly disposed portions, one portion having its interior space of less width than the collar of the steel, the other portion having its interior space greater than the width of said collar, a ring mounted on the steel holding means, and a link pivoted to the ring and to the retaining link.

6. The combination with means for holding a collared steel and having a socket for receiving such steel of a retaining link comprising angularly disposed portions, one portion having its interior space of less width than the collar of the steel, the other portion having its interior space greater than the width of said collar, a ring mounted on the steel holding means, and a link pivoted to the ring and to the outer end of the portion of the link having the larger interior space.

7. The combination with a drilling motor having means for holding a collared steel to be operated on, of a retainer for the steel comprising a link that surrounds the steel in advance of the collar and has angularly disposed portions, and a flexible connection between the link and the drilling motor for securing the link to the motor wholly in advance of the retaining means and permitting either of the angular portions of the link to be moved to a position across the steel in advance of the holding means and with the steel extending therethrough.

8. The combination with a holder that detachably receives a collared steel, of a retainer for said steel comprising a link having a portion that will permit the passage of the collar of the steel and an angularly disposed smaller portion that will prevent the passage of the collar, and means at one side of the holder and steel for mounting the link to permit its smaller portion to embrace a steel transversely thereof and in advance of the collar thereof and in advance of the holder and also permit the angularly disposed larger portion to be positioned transversely of the steel, completely across the same and in advance of the holder to permit the passage of the collar of the steel therethrough.

9. The combination with a holder that detachably receives a collared steel, of a retainer for said steel comprising a link having a portion that will permit the passage of the collar of the steel and a smaller portion that will prevent the passage of the collar, and means at one side of the holder and steel for loosely hanging the link by its larger portion at one side of the holder and in a position to permit either its larger or smaller portion to swing to a position transversely of the steel completely across the same and in advance of the front end of the holder to prevent or permit the passage of the collar of a drill steel therethrough.

10. The combination with a holder that detachably receives a collared steel, of a retainer for said steel comprising a link having angularly disposed portions of different internal cross sectional areas, the smaller portion preventing the passage of a steel collar therethrough, the larger portion permitting such passage, and means at one side of the holder and steel for loosely hanging the link at one side of the holder and in a position to normally hang with its smaller portion transversely of and in advance of the holder, said hanging means permitting the larger angularly disposed portion to be swung transversely of and in advance of the front end of the holder and completely across the steel.

11. The combination with a holder that detachably receives a collared steel, of a retainer for said steel comprising a link having angularly disposed portions of different internal cross sectional areas, the smaller portion preventing the passage of a steel collar therethrough, the larger portion permitting such passage, and means at one side of the holder and steel for loosely hanging the link by its larger portion at one side of the holder and steel to cause the smaller portion to normally embrace the steel transversely thereof and in advance of its collar but permitting the larger portion to be swung transversely and completely across the steel and in advance of the front end of the holder to permit the passage of the steel.

In witness whereof I affix my signature.

ARTHUR H. SKAER.